US009996781B2

(12) United States Patent
Ritter et al.

(10) Patent No.: US 9,996,781 B2
(45) Date of Patent: Jun. 12, 2018

(54) SELECTIVELY OPTICALLY READABLE DATA CARRIER

(71) Applicant: Actilor Intellectual Asset AG, Malans (CH)

(72) Inventors: Ulrich Ritter, Nidda-Schwickartshausen (DE); Samuel Schindler, Grusch (CH); Geza Murvai, Leipzig (DE)

(73) Assignee: ACTILOR INTELLECTUAL ASSET AG, Malans (CH)

( * ) Notice: Subject to any disclaimer, the term of this patent is extended or adjusted under 35 U.S.C. 154(b) by 0 days. days.

(21) Appl. No.: 15/521,177

(22) PCT Filed: Oct. 5, 2015

(86) PCT No.: PCT/EP2015/072910
§ 371 (c)(1),
(2) Date: Apr. 21, 2017

(87) PCT Pub. No.: WO2016/062529
PCT Pub. Date: Apr. 28, 2016

(65) Prior Publication Data
US 2017/0364783 A1   Dec. 21, 2017

(30) Foreign Application Priority Data
Oct. 24, 2014   (EP) .................................... 14190328

(51) Int. Cl.
G06K 19/06 (2006.01)
B41M 3/14 (2006.01)
(Continued)

(52) U.S. Cl.
CPC ....... *G06K 19/06065* (2013.01); *B41M 3/148* (2013.01); *B42D 25/328* (2014.10); *B42D 25/36* (2014.10); *B42D 25/425* (2014.10)

(58) Field of Classification Search
CPC ...... B42D 25/29; B42D 25/00; B42D 25/435; B42D 25/445; B42D 25/36; B42D 25/425;
(Continued)

(56) References Cited

U.S. PATENT DOCUMENTS

2007/0298271 A1* 12/2007 Liu .......................... B32B 7/12
428/480
2010/0119738 A1* 5/2010 Suzuki ............... C09K 19/2007
428/29

(Continued)

FOREIGN PATENT DOCUMENTS

DE    1 983 177 U      4/1968
DE    101 63 428 A1    7/2003
(Continued)

OTHER PUBLICATIONS

English translation of the International Preliminary Report on Patentability dated May 4, 2017 issued by the International Bureau in International Application No. PCT/EP2015/072910.
(Continued)

*Primary Examiner* — Thien T Mai
(74) *Attorney, Agent, or Firm* — Sughrue Mion, PLLC

(57) ABSTRACT

The invention relates to a data carrier comprising a storage layer forming a plurality of first surface elements (6). The storage layer (2) has at least one optical characteristic, which is optically anisotropic and which varies spatially between the first surface elements (6). A cover layer (3) over the storage layer (2) forms a plurality of second surface elements (10), each acting as a polarization filter for a predetermined polarization direction. The predetermined polarization direction varies between the second surface elements (10). The storage layer can contain in particular bacteriorhodopsin in the form of a purple membrane. The invention also
(Continued)

relates to a method for the production and reading of a data carrier of this type.

12 Claims, 5 Drawing Sheets

(51) Int. Cl.
*B42D 25/328* (2014.01)
*B42D 25/425* (2014.01)
*B42D 25/36* (2014.01)

(58) Field of Classification Search
CPC .......... B42D 25/328; G07D 7/12; G07D 7/20; G06K 9/00442; G06K 9/2063; G06K 9/228; G06K 19/06046; G06K 19/06065; B32B 7/12; B32B 27/08; B32B 27/30; B32B 27/36; G02B 1/10; B41M 3/148
See application file for complete search history.

(56) References Cited

U.S. PATENT DOCUMENTS

| | | | |
|---|---|---|---|
| 2012/0235958 A1* | 9/2012 | Chen | G06K 19/07707 235/492 |
| 2014/0044337 A1* | 2/2014 | Rutz | G06K 9/00442 382/137 |

FOREIGN PATENT DOCUMENTS

| | | | |
|---|---|---|---|
| DE | 10 2007 044 486 A1 | 3/2009 | |
| DE | 102007044486 A1 * | 3/2009 | ....... G06K 19/06046 |
| EP | 0 406 850 A1 | 1/1991 | |
| EP | 0 487 099 A2 | 5/1992 | |
| EP | 0 532 029 A1 | 3/1993 | |
| EP | 0 655 162 A1 | 5/1995 | |
| EP | 1 171 309 A1 | 1/2002 | |
| EP | 1 459 301 A2 | 9/2004 | |
| WO | 2004/009373 A1 | 1/2004 | |
| WO | WO 2004009373 A1 * | 1/2004 | ............ B42D 25/29 |

OTHER PUBLICATIONS

T. Fischer et al., "Biomolecular Optical Data Storage and Data Encryption", IEEE Transactions on Nanobioscience, Mar. 2003, vol. 2, No. 1, pp. 1-5, ( 5 pages total).
Martin Imhof, "Polarisationsdatenspeicherung in Bakteriorhodopsin-Schichten", Dissertation, Marburg University, 2012.
W. D. Koek, et al., "Holographic simultaneous readout polarization multiplexing based on photoinduced anisotropy in bacteriorhodopsin", Optics Letters, Jan. 1, 2004, pp. 101-103, vol. 29, Issue 1.
International Search Report for PCT/EP2015/072910 dated Dec. 10, 2015 [PCT/ISA/210].
Written Opinion for PCT/EP2015/072910 dated Dec. 10, 2015 [PCT/ISA/237].
European Office Action for 14 190 328.6 dated Jan. 26, 2016.

* cited by examiner

SELECTIVELY OPTICALLY READABLE DATA CARRIER

CROSS REFERENCE TO RELATED APPLICATIONS

This application is a National Stage of International Application No. PCT/EP2015/072910 filed Oct. 5, 2015, claiming priority based on European Patent Application No. 14190328.6 filed Oct. 24, 2014, the contents of all of which are incorporated herein by reference in their entirety.

TECHNICAL FIELD

The present invention relates to an optically readable data carrier that can serve, for example, for identifying or marking an object, in particular for securing documents and valuable papers, and to methods for producing and for reading such a data carrier.

PRIOR ART

Highly secure documents in the form of paper documents, such as passports, banknotes and those having a card-type design, and also documents for protecting the originality of a product, such as warranty certificates, declarations of compliance and original packaging, contain security functions, colloquially also referred to as security features, for protecting against forgeries, false authentication or identification. Depending on the requirements in terms of security, a plurality of security features are used in a document that differ or mutually complement each other—albeit not necessarily so—with respect to their security level and their function. In terms of security levels, a person skilled in the art of security documents differentiates between first-level features, which may be recognized with the naked senses and are typically visible features, e.g. a security thread or a see-through feature (e.g. two complementary image halves, each on one side of the document), and second-level features, which require simple additional aids in order to be recognized, such as for example a UV lamp or a laser pointer, and finally third-level features, which require a greater effort of proof. Third-level features necessitate complicated apparatus and even a forensically equipped laboratory environment in order to be verified. The security features here do not only differ in terms of the reliability of the verification process, but also in terms of their task. Authentication secures the authenticity of the document, while identification makes a statement relating to goods, institutions or persons associated with the document. In passports, for example, this would be the holders of the documents. Accordingly, security features must be able to secure a security document as such, or serve for individualization (personalization). Depending on the type of feature, both mass security and individual security of the document are possible.

Of particular interest here are features which contain a function for data storage. Data storage functions for their part differ in terms of the quality of document security. Magnetic strips, for example, can serve as data storage, but are easily identifiable and manipulable. Electronic circuits, e.g. RFID chips, have a significantly higher security standard and require greater apparatus expenditure for data storage and falsification, in particular if access and the data itself are encoded. Of a high standard are data storage media that are not initially recognizable as such and whose function is accessible only to proprietary writers and readers. Particularly desirable are security features that have the potential of being able to be used at various security levels. Such features, for example, can be, on the one hand, visually recognizable by each user of the document by way of a particular effect, such as metamerism or as a hologram, and, on the other hand, such features can contain data that is stored as hidden data. Multi-functional features are of interest not only in the area of authentication and identification, but can also contain secondary functions for commercial tasks or track and trace functions. Depending on their range of functions, these security features may also be referred to as intelligent features. Demand is particularly high for such features in the field of high-security documents.

Securing the authenticity of objects based on a light-induced color change of the retinal protein bacteriorhodopsin (BR) is well known and the subject of an entire series of patent documents, e.g. of documents EP-A-0406850, EP-A-0487099, EP-A-0655162, EP-A-0532029, EP-A-1171309, EP-A-1459301 and of the background documents specified therein. BR exhibits this color change only in membrane-bound form; the term purple membrane (PM) is used in connection with BR. In the PM, the BR forms trimers that are arranged as a hexagonal two-dimensional crystal. In a suitable formulation, BR in PM exhibits a photocycle that includes a reversible, light-inducible color change from violet (in the dark, or after "resetting" by way of blue light) to mustard yellow (after exposure to white or green light). This color change is not imitable and can serve for protecting against forgeries of any type. The BR can be present as wild-type BR or as mutant BR (single or multiple mutations in the primary amino acid sequence); it can also be modified in other ways, for example by modifying the retinal molecule. PM can be present in the form of cell membrane fragments. The cell membrane fragments are planar pieces of typically a few micrometers in length and width and approximately 5 nanometers in thickness.

In addition, BR has states outside the photocycle that are of particular interest for the use of BR/PM applications as optical data storage. Through intensive irradiation with suitable laser light, a change to a state that is outside the normal photocycle (LIMB=laser-induced blue membrane) occurs by way of a two-photon process, followed by a change into a yellowish end state (TPP product=two-photon photo bleaching product) upon further irradiation. This change in state is irreversible. The BR molecules in the end state no longer participate in the photocycle; they are permanently bleached.

One prerequisite for data storage with BR/PM applications is a lasting spatial fixation of the BR molecule clusters, for example by way of embedding them in a suitable matrix material. In a BR/PM layer that is fixed in this way, the BR molecules have an isotropic distribution of spatial orientations and are spatially fixed in said orientations.

By irradiating sufficiently intensive light of a suitable wavelength into a surface element of such a BR/PM layer, surface elements can be irreversibly bleached selectively. Under observation with white light of low intensity, a bleached surface element appears yellowish to colorless, while an unbleached surface element appears violet and possibly exhibits a color change to yellow.

This can be exploited for data storage as follows: the BR layer is divided into surface elements, wherein each surface element corresponds to one bit. A bleached surface element corresponds to the state "1," and an unbleached surface element corresponds to the state "0" (or vice versa). In this way, the BR layer can be used as optical WORM storage. This is described, e.g., in Fischer et al. [T. Fischer, M.

Neebe, T. Juchem and N. Hampp, "Biomolecular optical data storage and data encryption," IEEE Transactions on NanoBiosciences 2003, 2, 1-5].

The storage capacity of each surface element in this method amounts to exactly one bit. This storage capacity can be increased, however, by writing the information while maintaining polarization, and reading it with polarized light (what is known as polarization multiplexing). If a surface element of a BR/PM layer is bleached using polarized laser light, those BR molecules are preferably transitioned into the TPP state whose chromophore (retinal) has a specific spatial orientation, specifically with its long axis substantially parallel to the polarization direction of the laser light. BR molecules whose chromophore has a sufficiently strongly differing orientation do not take part, or only to a very much lower degree, in the two-photon bleaching process and largely remain unchanged. Since the bleaching process is a two-photon process, which occurs only if a specific threshold value of light intensity has been exceeded, it is possible by way of suitable selection of the irradiated light intensity to make the angle distribution of the bleached BR molecules become relatively narrow.

By way of polarization-dependent bleaching, optical anisotropy in the plane of the BR layer occurs: If a surface element that is bleached in this way is observed with polarized white light of the same polarization as the light that was used for bleaching, the relevant surface element appears yellowish to colorless, i.e. bleached. However, if the same surface element is observed with polarized white light of the polarization direction that is orthogonal thereto, the violet color of the unbleached BR is seen, and, with a suitable composition (mutant, pH), the normal photocycle can also be observed, i.e. the surface element appears violet and possibly reversibly changes its color under sufficiently strong illumination to mustard yellow. The property "color" or "color change" has thus become optically anisotropic by way of the bleaching.

This can be exploited for optical data storage as follows: a first bit is written into a surface element with a first polarization direction, wherein for this data bit a surface element which has been bleached with the first polarization direction corresponds to the state "1," and an unbleached surface element corresponds to the state "0" (or vice versa). In addition, a second data bit is written to the same surface element with a second polarization direction (e.g. the polarization direction that is orthogonal to the first polarization direction). The first data bit can be read with observation light of the first polarization direction, and the second data bit can be read with observation light of the second polarization direction. What occurs is thus polarization multiplexing, wherein multiplexing with two polarization directions occurs per surface element. The abovementioned considerations can be generalized for more than two polarization directions.

The relevant background in this respect can be found in the dissertation by Martin Imhof [Martin Imhof, "Polarisationsdatenspeicherung in Bakteriorhodopsin-Schichten," Dissertation, Marburg University 2012].

DE 101 63 428 A1 likewise discloses optical data storage with a light-sensitive storage medium having photo-inducible anisotropy. The encoding of the data here, however, is different than in the above-illustrated method: Bleaching with a first polarization direction here corresponds to the value "1," and bleaching with a polarization direction that is orthogonal thereto corresponds to the value "0." In other words, a distinction is made between the states "not written," "written with value 1," "written with value 0," and "overwritten" (i.e. written with both polarization directions). This is exploited for an encryption method. When using more than two polarization directions, it is accordingly possible to store non-binary data, i.e. data with a different base than 2, when using 16 different, polarization directions, for example hexadecimal numbers, wherein each of the 16 polarization directions corresponds to a hexadecimal numeric value. However, polarization multiplexing does not take place.

In Koek et al. [W. D. Koek, N. Bhattacharya, J. J. M. Braat, V. S. S. Chan and J. Westerweel, Optics Letters, Vol. 29, Issue 1, p. 101-103 (2004)], light-induced anisotropy of BR is used to produce a polarization hologram with which two independent images within a single BR film can be read simultaneously using polarization multiplexing. However, only BR states within the normal photocycle are used here, i.e. the hologram only has a limited lifetime that, if the BR mutant D96N is used, is only about a minute.

A light modulator having a photochromic layer, which is optically activatable using control light, for modulating signal light is known from DE 198 31 777 A1. The light modulator has a filter layer, which reflects the control light in wavelength-selective manner, in order to reflect control light that has passed through the photochromic layer back. It is possible in this way for information from the control light to be transferred in a planar and temporally variable manner onto the signal light.

A feature based purely on optical data storage, on the basis of bacteriorhodopsin, can contain, by way of the information stored therein, further independent information which serves as security against forgery, but the information overall is basically openly accessible.

SUMMARY OF THE INVENTION

It is an object of the present invention to provide a data carrier for storing optically readable information, in which at least part of the information stored on the data carrier is hidden from an observer.

It is another object of the present invention to provide a method for storing data using such a data carrier.

The present invention provides a data carrier comprising a storage layer. The storage layer forms a plurality of first surface elements, wherein the storage layer has at least one optical property that is optically anisotropic and varies spatially between the first surface elements. Arranged above the storage layer according to the invention is a transparent or translucent cover layer forming a plurality of second surface elements which each act as a polarization filter for a predetermined polarization direction, wherein the predetermined polarization direction varies between the second surface elements.

The storage layer thus has at least one optical property. This optical property can be for example a color hue (e.g. red vs. yellow), a brightness value (e.g. dark vs. bright) in a specific wavelength range, and/or a color change property (e.g. color change observable vs. color change not observable). This property is embossed optically anisotropically into the storage layer, i.e. at least one surface element exists in which the optical property differs under observation with light of different polarization directions within the plane of the storage layer. The optical property can have been embossed optically anisotropically into the storage layer by using polarized writing light for writing to the surface elements of the storage layer, in particular linearly polarized writing light. As a result, information is embossed optically anisotropically into the storage layer.

Arranged above the storage layer is a cover layer. The cover layer acts as a spatially varying polarization filter. In concrete terms, a plurality of second surface elements of the cover layer are arranged over the storage layer, more precisely over the first surface elements of the storage layer, wherein each of said surface elements acts as a polarization filter for a predetermined polarization direction, preferably for a predetermined linear polarization direction in the plane of the storage layer. The predetermined polarization direction varies between the second surface elements. As a result, only the information that was embossed with the "suitable" polarization into the first surface element, specifically with the polarization direction that corresponds to the transmission polarization of the second surface element arranged thereon, is still readable for each first surface element of the storage layer.

It is possible in this way to hide ("mask") parts of the data that is written to the storage layer. The cover layer acts like a polarization mask. The data parts that are masked in this way are not lost in this case, but remain in the storage layer and are merely hidden from the eye of the observer. The hidden data can be recovered with suitable measures, for example by removal or modification of the cover layer.

In an advantageous embodiment, the cover layer has diffractive structures that are designed such that they optically anisotropically transmit or reflect light. In particular, the diffractive structures can be designed as diffraction gratings, in particular line gratings with or without "blazing." It is a known fact that optical gratings exhibit transmission that is dependent on the polarization angle of the incident light. For example, the transmission of light that is polarized orthogonally to the direction of the lines of the diffraction grating is generally significantly greater than that of light that is polarized parallel thereto. In this respect, a diffraction grating acts like a polarization filter, whose transmission polarization runs perpendicular to the line direction. The polarization filter effect can be maximized using a suitable configuration of the grating (line spacing, blazing angle, material selection), up to the nearly complete blocking of light that is polarized parallel to the line direction. The diffraction gratings can be designed in particular in the form of periodically arranged, parallel burrs on the surface of the cover layer that is remote from the storage layer. The periodicity is preferably about 200 nanometers to 1000 nanometers, preferably 400 nanometers to 800 nanometers. The diffractive structures are preferably open towards the surface of the data carrier, i.e. they are freely accessible from the outside.

The diffractive structures can be produced in a particularly simple manner by being embossed into the cover layer, for example a cover lacquer layer. Embossing diffractive structures into a still soft cover lacquer layer is known per se to a person skilled in the art. Lacquers that are embossed in this manner are widely used, from purely decorative applications all the way to high-security products. Machines operating with classical embossing methods are obtainable, for example, from James-River. Embossing can be effected either continuously using an embossing roller (analogously to a cylinder seal) or intermittently according to the "punch principle." The embossing male die is in this context also referred to as a "shim." Shims are typically produced from (nickel-plated) Si wafers using photolithographic methods. If the embossing takes place with an embossing roller, the result is what is known as a "wallpaper," having a pattern repeat of the motive that corresponds to at most the circumference of the embossing roller or an integer part thereof. Such embossing is known for example from "hologram" wrapping paper, which uses the embossed diffractive structures for purely decorative purposes. It is also possible to obtain security features in this way (patches, seals), wherein the latter is cut or punched from the roll into the end format.

Suitable intermittent methods for producing embossed structures are the "classic" vertical stamping methods and also blasting/explosive embossing and laser ablation.

Embossing can be done in individualized fashion in the manner of mechanical typewriters (type levers, ball head, type wheel). For individualized embossing, numbering systems for printing machines that are known per se, like the NUMEROTA system of the KBA NotaSys, can also be used. In the present context, a numbering system can be considered a further variation of the principle of a mechanical typewriter.

In preferred embodiments, the spatial variation of the optical property between the first surface elements for a first direction of the anisotropy (in the case of optically written data: for a first polarization direction of the writing light) defines a first data set that is readable using reading light of a first polarization direction, but is not readable using reading light of at least one further polarization direction. It is then preferred for the predetermined polarization direction of the second surface elements to vary such that part of the first data set is masked by the cover layer. In other words, it is thus preferred that, because of the cover layer, only part of a data set which is embossed with a predetermined polarization direction is still optically readable 'as is,' while the rest of the data set is hidden and can only be read using aids.

The storage layer can carry more than one bit in each first surface element by way of polarization multiplexing, as is known per se from the prior art (in particular as described in the abovementioned dissertation by Martin Imhof). In particular, the spatial variation of the optical property between the first surface elements for a number $p>1$ of different directions of the anisotropy can define in each case a data set in the form of a sequence of bits, with the result that p bits are stored in each of the first surface elements, wherein each of said bits is readable using light of a respectively assigned polarization direction. It is preferred in this case for the predetermined polarization direction of the second surface elements to vary between the second surface elements such that, for each of the first surface elements, exactly one of the bits that is stored therein is optically readable through the cover layer. Here, the number p is preferably a prime number $p=2, 3, 5, 7, 11, 13, \ldots$ etc. Each of the readable bits belongs to one of the p data sets, wherein the data set to which the read bit belongs can vary between the second surface elements.

The data sets can here represent any desired information. For example, a data set can contain binary coded information, e.g. the ASCII-coded name, the date of birth etc. of the holder of a passport; however, a data set can also form an image under visual observation; in that case, the data set is formed for example by dark/bright values of the image. Data sets of such different characters can also be present in mixed form in the storage layer. By way of example, the polarization directions of the second surface elements can be selected such that, under illumination with observation light, a data set in the form of an image becomes visible, while a second data set having binary coded information is masked by the cover layer and is not readable without further measures being taken. The range of possible combinations of data sets is not limited here in terms of scope.

In order to make the symmetry of the possible polarization directions evident to the user, the first and/or second surface elements can geometrically have a p-fold symmetry. They can also be arranged in a regular or quasi-regular p-fold pattern (for p=2, e.g. in a rectangular pattern, for p=3, e.g. in a triangular or a hexagonal pattern, for p=5, e.g. in Penrose tiling). However, this is not mandatory. Generally, the shape and arrangement of the first and second surface elements can be entirely arbitrary. The arrangement of the second surface elements can be, for example, in the form of the EURion constellation.

In a preferred embodiment, each of the first surface elements is assigned to exactly one second surface element, for example by way of the first and second surface elements being of identical size and being arranged exactly one on top of the other, or by way of a plurality of first surface elements together being covered by a second surface element.

The storage layer can contain in particular a pigment in which the optically anisotropic property can be produced with suitable measures, in particular by illuminating with sufficiently intensive polarized writing light. This pigment is preferably bacteriorhodopsin (BR) in the form of a purple membrane (PM), wherein the purple membrane is immobilized in the storage layer. The BR can be wild-type BR, mutant BR or a variant, in which the retinal was replaced by a different molecule. Immobilization of the purple membrane in the storage layer can be effected by way of direct embedding, e.g. embedding PM in a gelatin (unhardened or hardened, as is known from photographic films), preferably in a form as described in EP 1 767 988 A1, or by embedding a preparation of PM. This preparation can serve for protecting the BR against harmful environmental influences; in particular, the preparation of PM can protect the BR in a suitable manner by way of a surrounding layer. The purple membrane can possibly also be present in the form of microcapsules, as is described e.g. in WO 2010/124908.

When using a suitable mutant and preparation, unbleached BR can exhibit the above-described color change from violet to yellow; when bleaching with writing light, this color change is lost, and the color changes irreversibly into yellowish to colorless. BR consequently has at least three optical properties which are anisotropically variable by way of illuminating with polarized writing light, specifically first, the (reversible) color change property, second, the color hue at weak reading light, and third, the bright/dark contrast. Each of these properties can be used for reading the anisotropically embossed information.

However, instead of BR, a different photorefractive/photochromic material can also be used, for example Fe-doped $LiNbO_3$ or polyester that is functionalized with cyanoazobenzene. The material can be present in the form of color pigments in a transparent or translucent carrier layer.

A corresponding method for storing data or for producing a data carrier comprises:
  providing a storage layer which comprises at least one optical property that is anisotropically variable under the influence of polarized (in particular linearly polarized) writing light;
  storing data in the storage layer by exposing first surface elements of the storage layer to polarized (in particular linearly polarized) writing light, wherein said optical property is varied according to the data to be stored such that the optical property varies spatially between the first surface elements and becomes optically anisotropic at least in part of the first surface elements; and
  producing a transparent or translucent cover layer on the storage layer, wherein the cover layer has a plurality of second surface elements acting as (preferably linear) polarization filters for a predetermined polarization direction, with the second surface elements being arranged above the first surface elements, and wherein the predetermined polarization direction varies between the second surface elements.

The second and the third mentioned method features can be implemented in any desired order, i.e. it is conceivable for the cover layer to be applied only after the data has been stored, but it is also conceivable for the cover layer to be applied initially, before the data is stored, while the surface elements are varied only after the data is stored such that they act as polarization filters. It is also conceivable for the cover layer to be produced together with the polarizing surface elements before the data is stored, but the polarizing effect thereof is canceled during the storing of the data in a similar way as will be discussed in more detail below in connection with the reading process.

As has already been explained above, producing the cover layer can comprise the steps of:
  applying an unembossed cover layer onto the storage layer (preferably before the data is stored); and
  embossing diffractive structures into the cover layer (preferably after the data is stored) in order to produce the second surface elements acting as polarization filters, wherein the diffractive structures are designed such that they optically anisotropically transmit and/or reflect light.

For reading the unmasked part of the data, the following steps can be performed:
  illuminating the data carrier with unpolarized observation light;
  observing the observation light which is reflected by the storage layer through the cover layer or the observation light which is transmitted by the storage layer and the cover layer in order to read a part of the data that is specified by the predetermined polarization direction of the second surface elements.

These steps can be carried out without additional aids. However, only data that is not masked by the cover layer is read in this way. The masked data is not readable in this way or readable only with reduced contrast. That means that only data that is readable with the polarization direction that is produced by way of the diffractive structure becomes accessible for the naked eye. In other words, by embossing with a diffractive structure, only the bits whose polarization corresponds to the polarization that is produced by the embossed diffractive structure are read from the surface elements without further aids. The other bits become "unreadable" because of the embossed diffractive structure.

If one wished to read only a single data set for a specific anisotropy direction, it would suffice to design the entire cover layer as a polarization filter for the same polarization direction, i.e. by way of uniform embossing. This would provide security against forgery in a way, but is disadvantageous for the practical utilization of the stored information.

For this reason, a proposal is made for the polarization directions to differ between the second surface elements. Which bit remains readable does not need to be decided until immediately before the embossing. When using suitable embossing mechanics, a very high degree of flexibility becomes possible, comparable to the flexibility of a mechanical typewriter.

The observation light can be white light, but it can also be light of any desired visible wavelength range. If BR is used as the pigment, green light has proven advantageous for ensuring maximum bright/dark contrast during reading and thus optimum reading reliability.

If the cover layer has diffractive structures that are accessible from the outside, in particular embossed, it becomes possible with simple aids to read the masked data as well. This can be done using the following steps:

applying a medium which has a similar refractive index as the cover layer onto the cover layer;

illuminating the storage layer with observation light;

detecting the observation light which is reflected by the storage layer through the cover layer and the medium, or the observation light which is transmitted by the storage layer, the cover layer and the medium, wherein illuminating and/or detecting are effected in a polarization-selective manner.

The medium having a similar refractive index can be e.g. a gel, an oil or another suitable viscous medium. The medium is preferably wetting for the cover layer. To this extent, analogies to oil immersion in microscopy can be made. Here, the term "similar refractive index" is to be understood functionally such that the refractive index of the medium differs from the refractive index of the cover layer to such a small extent that the diffraction effect of the diffractive structures is substantially canceled. In absolute numbers, this can be the case, for example, if the refractive index of the medium differs by less than 0.2, preferably less than 0.1, better less than 0.05, from the refractive index of the cover layer. Refractive indexes of typical binders for the cover layer lie in the range of 1.49 to 1.65 (pure PMMA, for example, as an example of a UV-cured binder has a refractive index of 1.491, the refractive indexes of epoxides lie in the range of 1.55 to 1.63). The immersion oils known from microscopy are available as having refractive indexes of between 1.30 to 2.11 (e.g. by Cargille Labs). A "match" of the refractive indexes of the cover layer and of the medium is thus easily producible.

Reading the information that is stored in polarization-dependent manner can be effected with polarization-selective optical methods both in transmission and in reflection modes. For detecting the information thus read, for example CCD or CMOS chips of a camera that is conventional per se are suitable.

BRIEF DESCRIPTION OF THE DRAWINGS

Preferred embodiments of the invention will be described below with reference to the drawings, which serve merely for explanation purposes and are not to be interpreted in limiting manner. In the drawings.

DESCRIPTION OF PREFERRED EMBODIMENTS

Figure 1:
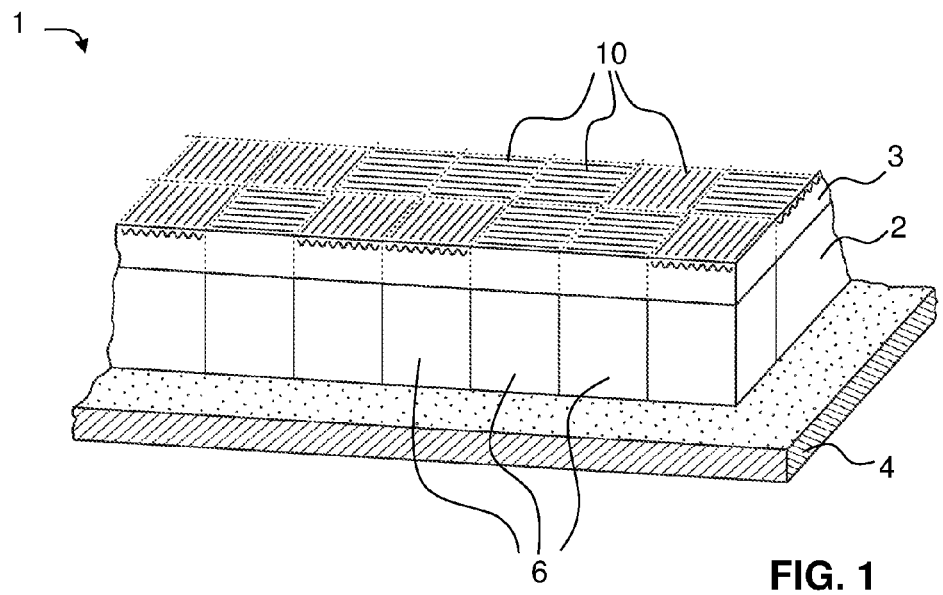
FIG. 1 shows a schematic sectional view of a data carrier according to a first embodiment.

FIG. 1 shows a schematic sectional view of a data carrier 1 according to a first embodiment. Arranged on a substrate 4 is a storage layer 2 having BR/PM pigments, and on top of that an embossable cover layer 3. The storage layer 2 will also be referred to as BR/ODS layer below. The layer thicknesses of the respective layers in relation to one another are not illustrated to scale, and the individual layer thicknesses are illustrated in strongly enlarged fashion for the purpose of better visibility.

The storage layer 2 can imaginary be divided into a multiplicity of regions, which in plan view form in each case a surface element (pixel) 6. In the present example, the regions have a cuboidal shape with a square base area and are laterally directly adjacent to one another. The individual surface elements 6 thus have a square shape. However, other shapes and arrangements of the surface elements are also possible, as will be described in more detail below.

One or more bits are written optically anisotropically to each of the surface elements 6, as will be described in more detail below. The surface elements 6 together thus form a data field to which data is written. The data stored in the data field can be, for example, directly visually perceivable data in the form of an image which is perceivable directly by observation with the naked eye and which is formed by way of a color contrast between the individual surface elements; alternatively, it can also be data coded in any desired manner, e.g. data in the form of a binary bit sequence (data string), which can be read in a meaningful way only when using appropriate aids.

Each of the regions that define in each case one surface element 6 contains a very large number of PM patches. The orientation of the PM patches is here distributed in stochastically uniform manner over all spatial directions. The PM patches are immobilized in the storage layer 2. As a result, each PM patch assumes a fixed orientation in space. When optically anisotropically writing the bits, polarized writing light is used. Here, only those BR molecules in the PM patches that have a "suitable" orientation are bleached. Although there is no wish to be bound by theory, the assumption is that the BR molecules whose retinal is arranged substantially parallel to the polarization direction of the writing light are bleached. In this way, the optical properties of the storage layer are optically anisotropically changed. In the present case, at least three perceivable properties are changed by writing with polarized light, specifically the color change (the bleached regions show no or a strongly reduced color change), the color value (the bleached regions appear yellowish under weak illumination with white light, whereas the unbleached regions appear violet) and the bright/dark value (the bleached regions appear brighter than the unbleached regions under illumination with white light or with spectrally limited light, e.g. green light). The optical property that is changed in this way in the specified polarization direction corresponds to the value of the written bit (e.g. bright=1, dark=0).

By way of polarization multiplexing, a number of p bits can be written to the same surface element 6. The number of the bits that are stored at the same time on the same surface element (data planes) is thus in the simplest case two, and the assigned polarization directions are in that case perpendicular to one another. It is likewise possible for three bits to be stored equally in the same surface element by way of the angle between the polarization directions being 60°.

Correspondingly, four bits (with 45 degrees angular difference), five bits (with 36 degrees angular difference) etc. can be stored equally.

The angle δ by which the polarization directions of the polarized light with which the bits are written differ can be expressed generally as follows:

Angle δ=360 degrees/(2·p).

p is here a natural number greater than or equal to 2. p is preferably a prime number, i.e. p is selected from the sequence p=2, 3, 5, 7, 11, 13, 17, 19, 23, 29, 31, 37, 41, 43, 47, 53, 59, 61, 67, 71, 73, 79, 83, 89, 97, 101, 103, 107, 109, 113, 127, 131, 137, 139, 149, 151, 157, 163, 167, 173, 179, 181, . . . .

Among others, the quality of the BR/ODS layer and the width of the angular distribution, which is produced during writing, of the bleached BR molecules here have a limiting effect on the number of the bits which are storable in the same surface element using such polarization multiplexing. In addition, in practice the angular resolution between various polarization directions that can still be differentiated during reading is relevant.

At an angular resolution of 1 degree, a maximum of 179 bits which are storable equally per surface element would therefore result. Such a high number, however, can be assumed to be a theoretical upper limit that can be reached only in optically perfect layers and in otherwise optimum optical conditions when writing and reading. In particular, polarization multiplexing with a suitable pixel size leads to a reduction in the BR molecules which are available for storing an individual bit, which results in a reduction of the signal-to-noise ratio.

The simultaneous storing of 2 to 13 bits in a surface element of the storage layer (2 to 13 data planes that are differentiable by polarization multiplexing) would thus ultimately be in line with practice, even though there is no theoretical upper limit for the number of bits in a surface element in the storage layer. A number of 2, 3, 4 or 5 bits per surface element (2, 3, 4 or 5 data planes) is preferred.

In addition to the differences in the linear polarization, differences in the circular polarization or mixed polarization values, as are described by Stokes parameters, can also be used for storing bits in a surface element.

The minimum size of a surface element 6 (minimum pixel size), in which bits can be stored in polarization-dependent manner, is defined substantially by the focal cross section of the laser beam during the writing process. The minimum lateral dimension is typically between 1 micrometer and 30 micrometers.

The cover layer 3 is configured such that individual bits in the storage layer are masked, i.e. such that, without additional measures, they are no longer readable or readable only under very difficult conditions. In order to mask the bits, the cover layer is regionally embossed with second surface elements 10 into which diffractive structures are embossed. As will be explained below in more detail, the embossing can be produced mechanically using shims. In the present example, each diffractive structure forms a diffraction grating of parallel, line-type indentations. The diffraction gratings are illustrated only highly schematically in plan view by way of line patterns and should not be understood to be to scale. Because the diffractive structures form diffraction gratings, they act as linear polarization filters. The predominantly transmitted polarization direction is here perpendicular to the direction of the lines of the grating. Here, the transmitted polarization direction differs from one second surface element to another second surface element 10.

In terms of their outline, the second surface elements 10 of the cover layer 3 in the present example are as large as the first surface elements 6 of the storage layer 2, and each second surface element 10 covers exactly one first surface element 6. However, it is also possible and preferred in practice for the size and shape of the second surface elements 10 to differ from the size and shape of the first surface elements 6, in particular in that in each case one second surface element covers a plurality of first surface elements.

The minimum size of the second surface elements 10 is defined primarily in production-technological terms by the minimum possible size of the diffractive structures. In practice, edge lengths of for example 500 micrometers to 2000 micrometers are realistic. As a result, each of the second surface elements can in practice cover several dozens to several thousands (e.g. between 100 and 10 000) of first surface elements.

FIG. 2 shows, again in a highly schematic fashion and not to scale, a second embodiment of a data carrier. In addition, an auxiliary layer 5 is present here between the substrate 4 and the storage layer 2. Said auxiliary layer can serve for example for promoting adhesion or can be configured as a decorative layer. Further such auxiliary layers can, of course, be present.

Figure 2:
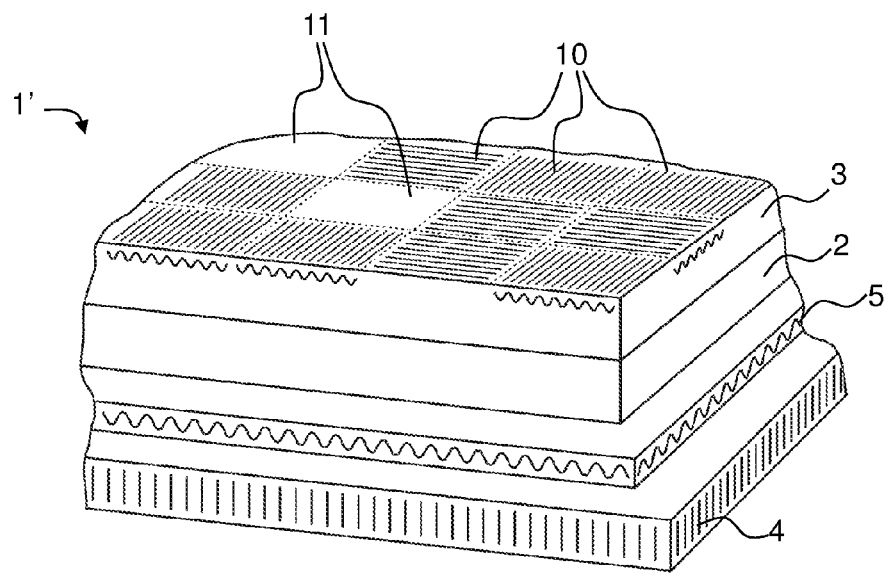
FIG. 2 shows a schematic sectional view of a data carrier according to a second embodiment.

In the example of FIG. 2, the second surface elements 10 of the cover layer 3 only partially cover the first surface elements 6 of the storage layer 2. For specific first surface elements 6, the embossing is omitted (non-embossed regions 11), i.e. it is possible that specific surface elements are not masked by the embossing.

Figure 3:
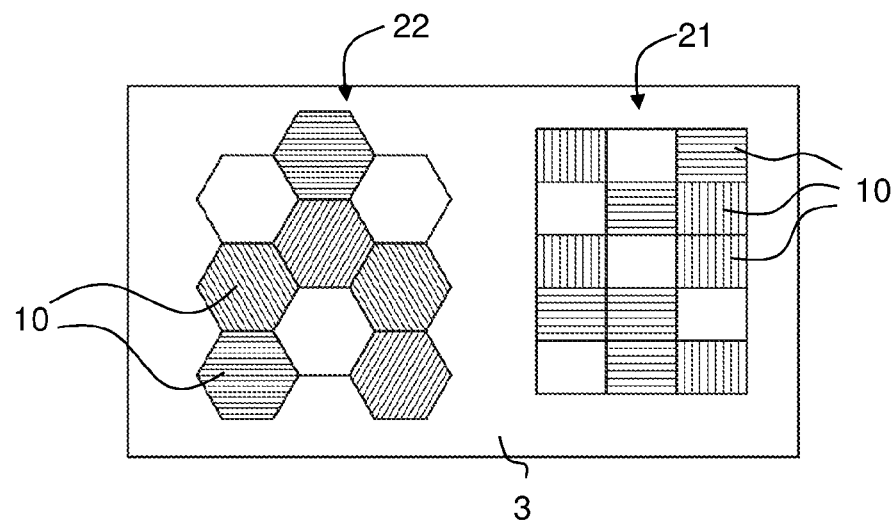
FIG. 3 shows a plan view of an embossed cover layer according to a first embodiment.
Figure 4:
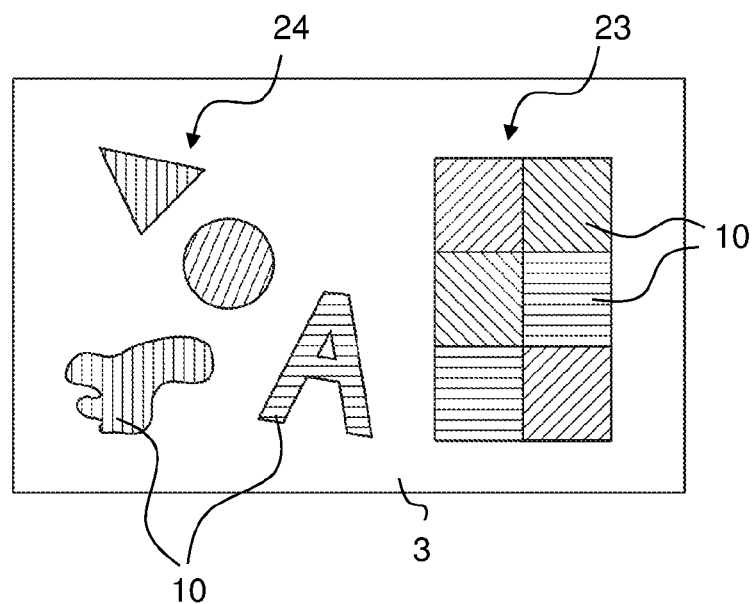
FIG. 4 shows a plan view of an embossed cover layer according to a second embodiment.

FIGS. 3 and 4 show by way of example different embossing patterns for the cover layer 3.

For example, FIG. 3 shows on the right-hand side embossing 21 made of diffraction gratings which form in part seamlessly adjoining, rectangular second surface elements 10. The line directions of the diffraction gratings (and the transmitted polarization directions which are perpendicular thereto) differ between neighboring second surface elements 10 in each case by 0° or 90°. Such embossing makes sense if the intention is to differentiate between exactly two polarization directions, specifically "horizontal" (0°) and "vertical" (90°) with respect to the drawing plane, because polarization multiplexing with exactly these two polarization directions was carried out in the storage layer during writing of the data. Between the shape of the second surface elements 10 and the polarization directions, a close relationship exists here: The alignment of the edges of the rectangular second surface elements corresponds to the polarization directions used for data storage. In this way, the observer can immediately perceive by way of the shape of the second surface elements which polarization directions were used for storing and are relevant for reading.

FIG. 3 shows on the left-hand side embossing 22, the second surface elements 10 of which have a hexagonal shape. In this embodiment, the individual second surface elements 10 also adjoin one another directly in part, and the diffractive structures in each of the surface elements 10 form a diffraction grating. The line directions of the diffraction gratings (and the transmitted polarization directions which are perpendicular thereto) differ between the second surface elements 10 by a multiple of 60°. Embossing of this type makes sense if the intention is to differentiate between three polarization directions, specifically 30°, 90° and 150° with respect to the horizontal of the drawing plane, because polarization multiplexing with these three polarization directions was carried out in the storage layer during writing of the data. Again, there is a close relationship between the shape of the second surface elements 10 and the polarization directions: the alignment of the edges of the hexagonal second surface elements corresponds to the three polarization directions used for data storage.

While the shape and alignment of the second surface elements in FIG. 3 have a close relationship to the polarization directions used, there is no discernible relationship between the shape of the second surface elements and the polarization directions used in the embossing 23, 24 of FIG. 4.

For example, in the embossing 23 in FIG. 4 on the right-hand side, the line directions of the diffraction gratings (and thus the transmitted polarization directions) differ between the second surface elements 10 by a multiple of 45°, i.e. there are four differentiable polarization directions ("horizontal," "vertical," "perpendicular to the top right," "perpendicular to the top left," or 0°, 45°, 90° and 135° with respect to the horizontal of the drawing plane). Such embossing makes sense if polarization multiplexing with four corresponding polarization directions was carried out in the storage layer when writing the data. The shape of the second surface elements here does not reflect the four-fold symmetry of the polarization directions, however.

There is even less correspondence in the embossing 24 in FIG. 4 on the left-hand side. Here, the second surface elements 10 have completely free forms, which have no relationship whatsoever with the polarization directions of the embossed diffraction gratings. In addition to the examples shown here, a large number of further outlines for the diffractive structures having polarizing effect are possible. For example, by using suitable embossing of the cover layer, it is possible to produce lettering or barcodes or other graphic characters on the data carrier that have polarizing effect. This allows for a great degree of flexibility. The dies used herefor differ here preferably only in terms of the alignment of the diffractive structure: for example, if two bits per surface element are stored in the ODS layer, two sets of types are used, wherein in that case the diffractive structures of the types of the individual sets are tilted relative to one another by 90°; in the case of three bits, there are three sets with an angle difference of 60°, and so on.

Because the embossing can be variably arranged, it is possible to individually decide flexibly, from one ODS surface element (i.e. first surface element in the storage layer 2) to the other ODS surface element, which bit per ODS surface element remains openly accessible. The remaining bits which are stored in each case per ODS surface element are hidden. This provides multi-dimensional flexibility of the security feature produced by combination.

The arrangement of the second surface elements 10 can also be a quasi-periodic arrangement, for example in the form of Penrose tiling of what are known as Penrose tiles. In this case, a further possibility for coding is attained: Since the position of the individual Penrose tile in the overall pattern is in some manner unique owing to the non-existing periodicity, the position of the surface element can extend the meaning of the data in a particular manner. It is possible to fill surfaces without gaps with such geometric shapes. The mathematical findings relating to "surface tiling" are known to a person skilled in the art. For an illustrative example relating to the possibilities which arise for the graphic design, see for example the "surface filling" patterns of the graphic designer M. C. Escher. The underlying mathematical principles therein (and in the aperiodic tile patterns) are known, as are the derivable consequences for coding, graphic design or information content.

Gap-free filling of the entire surface, however, is not mandatory, and is not even possible for example in the case of 7-fold symmetry. For example, circular second surface elements may also be provided, and the second surface elements can be positioned on the cover layer in the manner of a "chessboard," "with gap" or apparently without order and in any other arrangement. Any arrangement is possible, be it for taking into account the design of the entire identified object, or be it for the arrangement of the embossed second surface elements in turn coding data via data-carrying first surface elements. One example of such a meaningful arrangement of second surface elements is the EURion constellation (aka Omron rings), which is used, among other things, in EURO banknotes.

Figure 5:
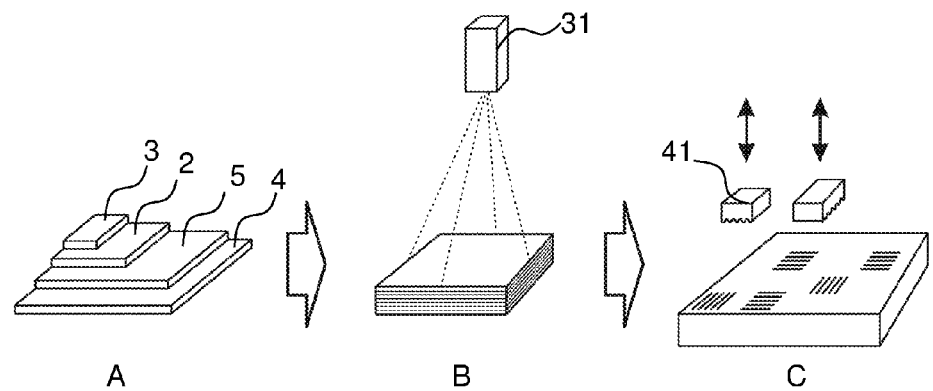
FIG. 5 shows a schematic of a method for producing a data carrier with data that is stored therein.

FIG. 5 illustrates in a highly schematic fashion how it is possible to produce, write to and mask a data carrier of the type discussed here. In step A, the data carrier is initially prepared by coating a substrate 4 optionally with one or more auxiliary layers 5, a data layer 2, and a still soft, embossable cover layer 3. The data layer 2 at this time has not yet been written to. In step B, the data carrier is then exposed, pixel by pixel, to polarized laser light (indicated schematically by way of a laser arrangement 31), and the data layer is thus optically anisotropically written to. In step C, the diffractive structures are ultimately embossed into the still soft cover layer 3, for example using dies (shims) 41, and the cover layer is finally cured (for example cures by itself to completion).

Figure 6:
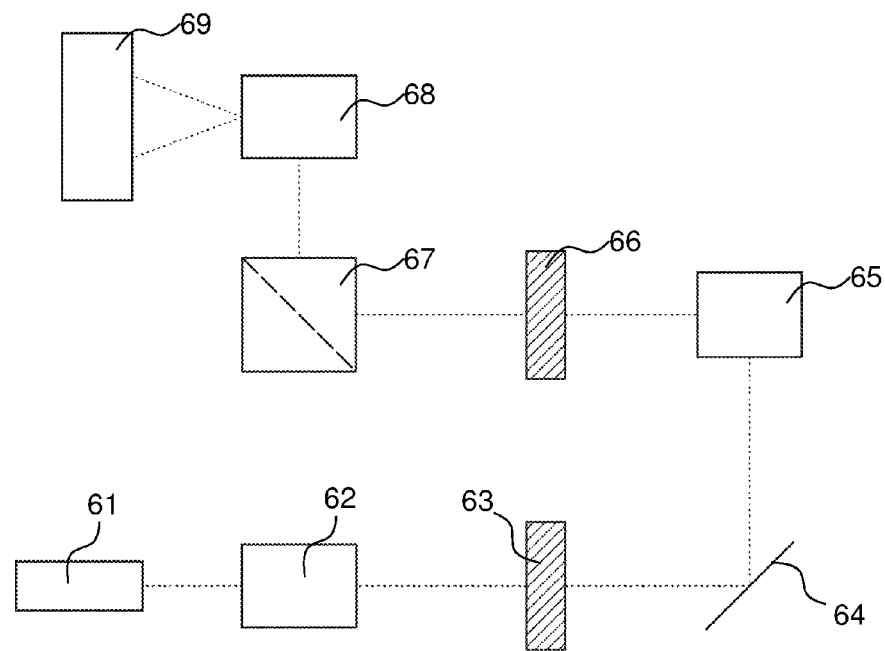
FIG. 6 shows a schematic of a laser optical system for storing the data in the data carrier.

FIG. 6 schematically illustrates a laser arrangement that is known per se, which can be used for writing to the data carrier. Laser light from a laser 61 is guided via optical elements 62 for improving the beam quality (e.g. an arrangement for beam widening, suitable filters such as IR filters etc.). By way of a rotatable first retardation plate (λ/2 plate) 63, the light strikes a first mirror 64, travels from here through a beam splitter 65 and through a second retardation plate (λ/2 plate) 66 to a further beam splitter which acts as a polarizer 67 and into a galvo scanner 68, which focuses the light onto a focal point on the sample 69 and with which the sample 69 (i.e. the data carrier) is written to, pixel by pixel. Further details can be found in the dissertation by Martin Imhof, at the cited location, and are known per se to a person skilled in the art.

Figure 7:
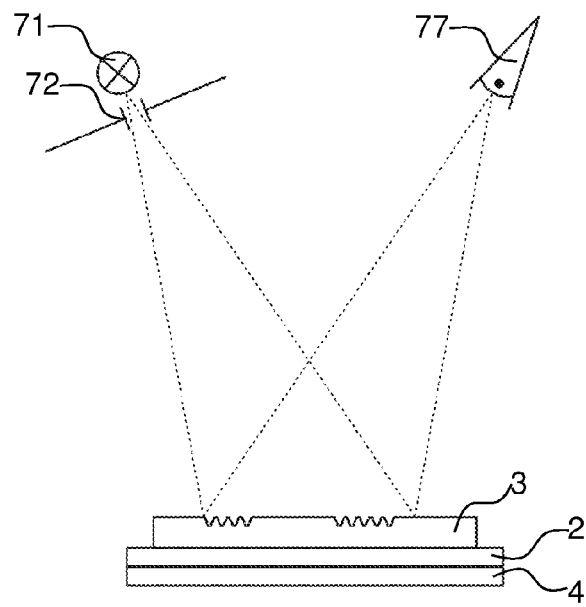
FIG. 7 shows a schematic for reading the data from the data storage according to a first embodiment.
Figure 8:
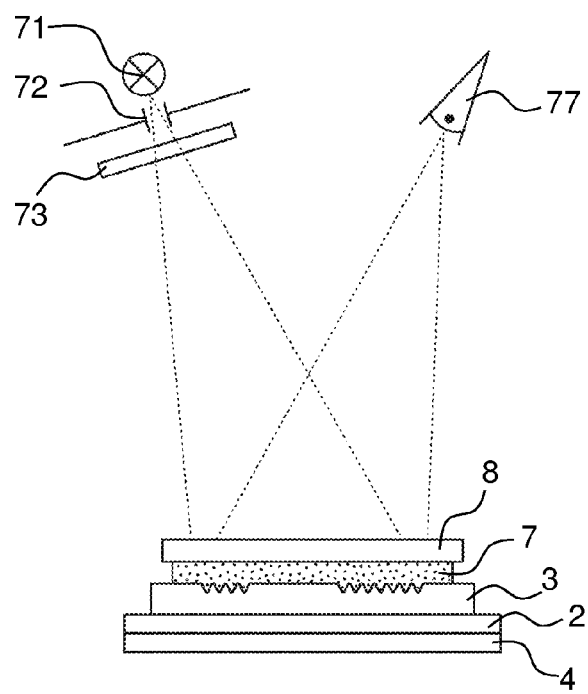
FIG. 8 shows a schematic for reading the data from the data storage according to a second embodiment.
Figure 9:
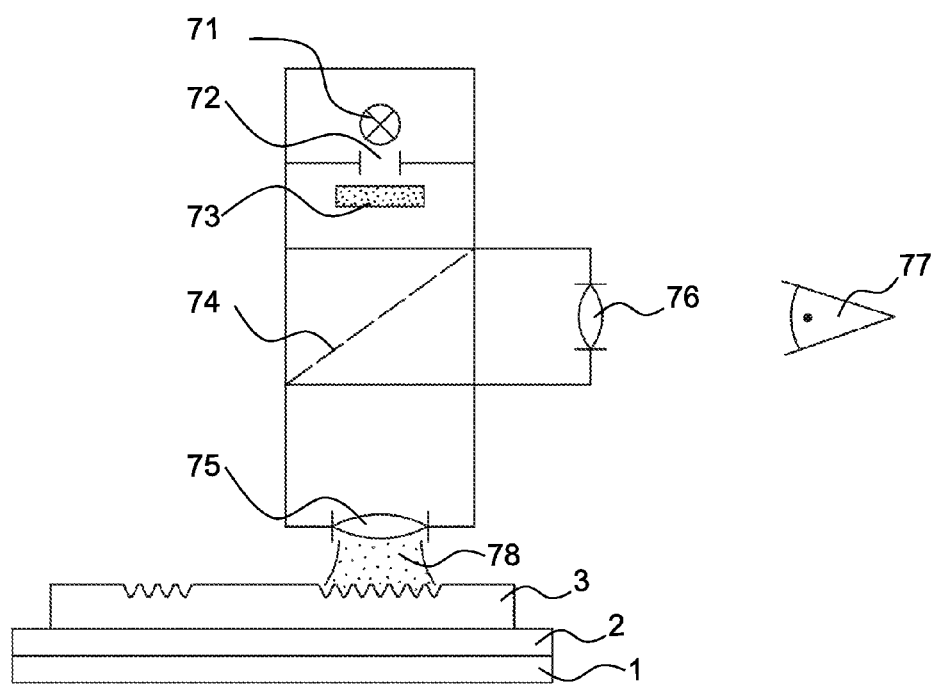
FIG. 9 shows a schematic for reading the data from the data storage according to a third embodiment.

Various possibilities for reading the data from the storage layer 2 are illustrated schematically in FIGS. 7-9.

The simplest case is illustrated schematically in FIG. 7. Here, unpolarized observation light from a light source 71 is radiated using a stop 72 from obliquely above onto the cover layer 3, and the observation light that is transmitted by the cover layer 3 and reflected by the storage layer 2 is observed with the eye or with a detector (here symbolized by an eye 77). The radiated observation light here has an intensity that is far below the threshold value required for writing the information. As a result, the observation light does not change any data in the storage layer. The cover layer 3 acts as a polarization filter for the incoming and outgoing observation light. Mainly light that is linearly polarized perpendicularly to the direction of extent of the lines of the diffractive structure passes through the cover layer 3. As a result, only information that was previously written using the same polarization is readable from the storage layer. The remaining information is not readable or readable only at a very much lower contrast; it is thus masked by the cover layer.

Observation can also be in transmission rather than in reflection. However, observation in reflection is preferred because in this case the observation light passes through the cover layer 3 twice. This increases the polarization filter effect of the cover layer 3.

If the second surface elements 10 of the cover layer 3 are larger than the first surface elements (pixels) 6 of the storage layer, a plurality of bits per masked polarization direction, up to several kBits, are masked in the ODS storage layer during the reading process per second surface element. At a pixel size of 10 micrometers, assuming a square shape, and a, for example square, polarization filter with an edge length of 1 mm, the reading process accesses for example 10 kBits of a data plane.

If there is also a need to make accessible the masked data sets in the ODS storage layer to the observer, it is possible to cancel the effect of the polarization filters produced by embossing the cover layer by way of applying a wetting liquid or a wetting gel, both in each case having a refractive index that is near the refractive index of the diffractively embossed cover layer. This is illustrated in FIGS. 8 and 9.

In FIG. 8, a wetting oil layer 7 (e.g. an immersion oil, as is known from microscopy) is applied onto the cover layer 3 and covered using a cover plate 8. Because of the application of the oil onto the cover layer, the effect of the polarization filters produced by embossing the cover layer is canceled, with the result that all the information of the BR/ODS layer is readable again. In other words, the effect of the embossed, diffractive structures is canceled by a medium having a similar refractive index as the cover layer, with the result that the embossed, diffractive structures are without effect and all bits per surface element are readable again. For reading the individual bits, a rotatable polarization filter 73, or a polarization filter 73 which is adjustable in terms of its polarization direction, is now used. Said polarization filter 73 linearly polarizes the observation light. As a result, only the bits that match the polarization direction of the observation light are now read. Instead of polarizing the observation light during the illumination, it is also possible to radiate unpolarized observation light and to utilize a polarization filter on the observer-side.

A second possibility for the observation is illustrated in FIG. 9. Here, observation light from a light source 71 is passed through a diffuser (not illustrated), a stop 72 and a polarization filter 73 onto a beam splitter 74, from where it travels through an immersion lens 75, serving as an objective lens, without air gap directly into a wetting immersion oil 78 and from there, via the cover layer 3, into the storage layer 2. Through the cover layer 3, the immersion oil 78 and the lens 75, the reflected light travels back into the beam splitter 74, from where it reaches the detector or the eye of the observer via an exit lens 76 that serves as an eyepiece.

Further details regarding the possible setup of a reader that is suitable for various data planes are described for example in the dissertation by Martin Imhof, at the cited location.

It is irrelevant for the method introduced here whether the data-carrying storage layer is arranged directly on the carrier (substrate) of the end use or on an intermediate layer located on the carrier.

The ODS layer which is used as the storage layer can be designed according to the layer described in DE 101 63 428 A1 or the layer described in the dissertation by Martin Imhof, at the cited location, or can be a layer which is printed with actiLOR screen printing ink onto the substrate or with another suitable preparation or is otherwise applied. The cover layer is preferably a cover lacquer, as is used for embossing diffractive structures, for example cationically curable UV lacquer, which is not cured completely by UV light and is therefore still soft and embossable, and continues to react after the embossing by dark reaction and cures by itself to completion.

Alternatively, a radically curing UV lacquer can be used, which cures completely after the embossing by way of a subsequent second UV curing step. Furthermore, a physically drying solvent lacquer (also water as solvent) can be embossed before complete evaporation of the solvent, and be cured after the embossing by way of subsequent, complete evaporation of the solvent.

In order to be able to emboss diffractive structures into the cover layer, dies can be used. These dies are mechanical units, such as for example the types in a typewriter, a numbering system of a printing machine, or, in one extreme embodiment, the surface of a needle tip of a matrix printer. The repetitive structure in the die which serves as the female die for the diffractive, polarizing structure in the cover layer can be produced by way of laser ablation, for example. However, other methods are also conceivable.

Also conceivable are combinations of classic, visually perceivable features, such as for example lettering of names of persons or two-dimensional barcodes, with the suggested reading from a polarization-oriented ODS storage layer, by way of the form of the dies receiving for example the form of a letter of lettering or even the form and function of a two-dimensional barcode.

It is also conceivable for example to store a first data set in the form of personal data in text form in the storage layer with a first polarization direction, to store a second data set in the form of cryptographic keys in the storage layer with a second polarization direction, and to store a third data set in the form of image data and a fourth data set in the form of meta data relating to the image data in the storage layer with further polarization directions. It makes sense in practice to query, on different regions of the document or data carrier using non-polarized light in a simple manner, specific data combinations, for example personal data of a holder of the document at one location of the document, image data at another location, meta data relating to the image, for example recording date and recording location, and a key for reading the personal data at other locations of an identity document.

Such a data carrier is used primarily in valuable documents and substrates from which valuable documents are made and thus represents a preliminary stage of the actual valuable document. Valuable documents within the meaning of this invention are passports, ID cards, ID documents, certificates, shares, check forms, banknotes and labels for securing products against forgery or falsification and objects of any type which are at risk from forgery or falsification, such as pharmaceutical packaging, packaging for cosmetics, or entrance tickets etc.

The invention claimed is:

1. A data carrier, comprising:
   a storage layer; and
   a transparent or translucent cover layer that is arranged above the storage layer, wherein the cover layer forms a plurality of second surface elements which each act as a polarization filter for a predetermined polarization direction, wherein the predetermined polarization direction spatially varies between the second surface elements,
   wherein the storage layer forms a plurality of first surface elements, wherein the storage layer has at least one optical property that is provided optically anisotropically in the storage layer and which spatially varies between the first surface elements such that the spatial variation of the optical property for a first direction of the anisotropy defines a first data set that is readable using light having a first polarization direction, but is not readable using light having at least one further polarization direction, wherein the second surface elements are arranged above the first surface elements, and wherein the predetermined polarization direction of the second surface elements spatially varies such that part of the first data set is masked by the cover layer.

2. The data carrier as claimed in claim 1, wherein the second surface elements have diffractive structures which are designed such that they optically anisotropically transmit or reflect light.

3. The data carrier as claimed in claim 2, wherein the diffractive structures are provided by embossing into the cover layer.

4. The data carrier as claimed in claim 1, wherein the spatial variation of the optical property between the first surface elements for a number p>1 of different directions of the anisotropy defines in each case a data set in the form of a sequence of bits, such that in each of the first surface elements, p bits are stored, with each of said bits being readable using light of a respectively assigned polarization direction, and wherein the polarization direction of the second surface elements varies between the second surface elements such that for each of the first surface elements one of the bits stored therein is optically readable through the cover layer, while the other bits are masked by the cover layer.

5. The data carrier as claimed in claim 4, wherein the second surface elements geometrically comprise a p-fold symmetry.

6. The data carrier as claimed in claim 1, wherein each of the first surface elements is covered by exactly one second surface element.

7. The data carrier as claimed in claim 1, wherein the storage layer has bacteriorhodopsin in the form of a purple membrane, and wherein the purple membrane is immobilized in the storage layer.

8. A method for producing a data carrier, comprising:
providing a storage layer which has at least one optical property that is anisotropically variable under the influence of light;
storing data in the storage layer by exposing first surface elements of the storage layer to polarized writing light, wherein said optical property is varied according to the data to be stored such that the optical property varies spatially between the first surface elements and is optically anisotropic at least in part of the first surface elements, wherein the spatial variation of the optical property between the first surface elements for a first polarization direction of the writing light defines a first data set that is readable using light having the first polarization direction, but is not readable using light having at least one further polarization direction; and
producing a transparent or translucent cover layer on the storage layer, wherein the cover layer has a plurality of second surface elements acting as polarization filters for a predetermined polarization direction, with the second surface elements being arranged above the first surface elements, and wherein the predetermined polarization direction spatially varies between the second surface elements such that part of the first data set is masked by the cover layer.

9. The method as claimed in claim 8, wherein producing the transparent or translucent cover layer comprises:
applying the cover layer in as yet non-embossed form onto the storage layer before or after storing the data; and
embossing diffractive structures into the cover layer to produce the second surface elements which act as polarization filters, wherein the diffractive structures are designed such that they transmit or reflect light in polarization-dependent manner.

10. A method for reading a data carrier as claimed in one of claim 1, comprising:
illuminating the data carrier (1) with unpolarized observation light;
observing the observation light which is reflected by the storage layer through the cover layer or the observation light which is transmitted by the storage layer and the cover layer in order to read a part of the data that is specified by the predetermined polarization direction of the second surface elements.

11. A method for reading a data carrier as claimed in claim 1, comprising:
applying a medium which has a similar refractive index as the cover layer onto the cover layer;
illuminating the storage layer with observation light;
detecting the observation light which is reflected by the storage layer through the cover layer and the medium, or the observation light which is transmitted by the storage layer, the cover layer and the medium,
wherein at least one of illuminating and/or detecting are effected in a polarization-selective manner.

12. The data carrier according to claim 1, wherein the storage layer contains a pigment in which the optically anisotropic property is producible by illumination with polarized writing light.

* * * * *